(12) United States Patent
Wang

(10) Patent No.: US 8,773,846 B2
(45) Date of Patent: Jul. 8, 2014

(54) CONNECTING ASSEMBLY AND ELECTRONIC APPARATUS HAVING SAME

(75) Inventor: Kai-Gui Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/474,739

(22) Filed: May 18, 2012

(65) Prior Publication Data

US 2013/0027852 A1 Jan. 31, 2013

(30) Foreign Application Priority Data

Jul. 26, 2011 (CN) .......................... 2011 1 0210491

(51) Int. Cl.
*G06F 1/16* (2006.01)
(52) U.S. Cl.
CPC ..................................... *G06F 1/166* (2013.01)
USPC ................... 361/679.02; 248/538; 455/575.4; 206/286
(58) Field of Classification Search
CPC ........................................................ G06F 1/00
USPC ........... 248/206.5, 637, 231.9, 918, 538, 520, 248/118, 188, 636; 428/304.4; 361/679.01, 361/679.21, 679.02, 679.08, 679.32, 361/679.56, 679.3, 679.57, 679.55, 679.4, 361/679.58, 679.27, 679.31; 439/42, 158, 439/173, 651, 138, 411, 567; 455/566, 455/575.3, 90.3, 575.4, 575.1; 206/466, 206/467, 468, 470, 286
See application file for complete search history.

(56) References Cited

U.S. PATENT DOCUMENTS

| | | | | |
|---|---|---|---|---|
| 6,378,832 | B1 * | 4/2002 | Li et al. ......................... | 248/637 |
| 6,969,551 | B2 * | 11/2005 | Richardson et al. ....... | 428/304.4 |
| 2009/0236480 | A1 * | 9/2009 | Lai .............................. | 248/206.5 |

* cited by examiner

*Primary Examiner* — Hung Duong
(74) *Attorney, Agent, or Firm* — Novak Druce Connolly Bove + Quigg LLP

(57) ABSTRACT

A connecting assembly for connecting a first member and a second member, and the connecting assembly includes a resilient receiver and a securing plug. The second member defines a through hole. The resilient receiver is fixed to the first member and also defines a receiving space. A top of the resilient receiver passes through the through hole. The securing plug is configured to be inserted into the receiving space, which expands a part of the resilient receiver so as to fix the top of the resilient receiver on the second member thereby connecting the first member with the second member. Present disclosure also provides an electronic apparatus having the connecting assembly.

14 Claims, 5 Drawing Sheets

CONNECTING ASSEMBLY AND ELECTRONIC APPARATUS HAVING SAME

BACKGROUND

1. Technical Field

The present disclosure relates to a connecting assembly and an electronic apparatus having the connecting assembly.

2. Description of Related Art

Many products or equipments are manually assembled by threading bolts into screw holes. However, this mechanical connection is very time-consuming. In addition, the bolts can become worn and will be ineffective after repeated operations.

Therefore, there is a need for overcoming the limitations described above.

DETAILED DESCRIPTION

Figure 1:
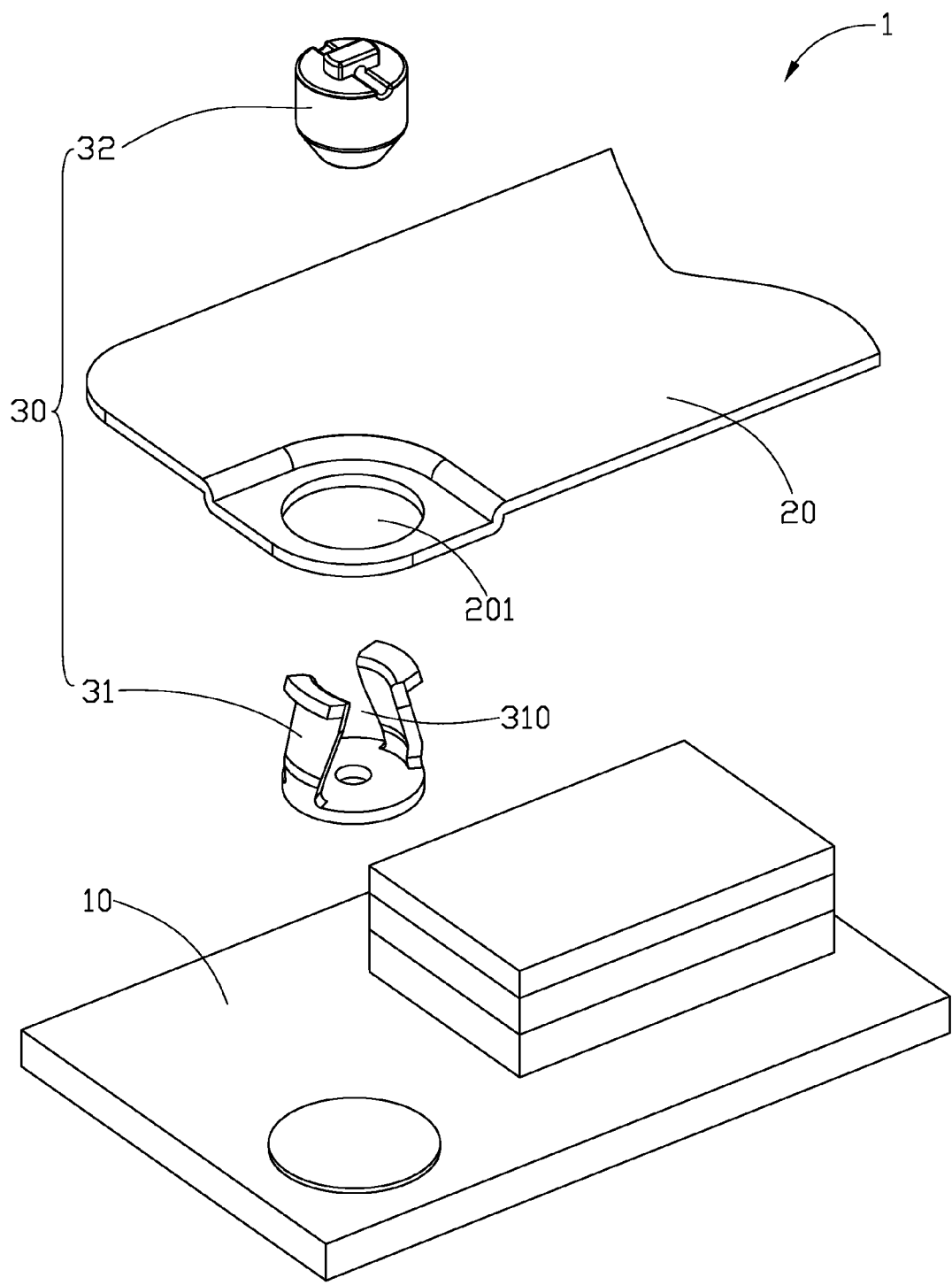
FIG. 1 is an exploded view of an electronic apparatus, according to a first embodiment.

FIG. 1 is an exploded view of an electronic apparatus, according to a first embodiment. The electronic apparatus 1 includes a first member 10, a second member 20, and a connecting assembly 30 connecting the first member 10 and the second member 20. The connecting assembly 30 is capable of assembling and disassembling the first member 10 and the second member 20 effectively.

Figure 2:
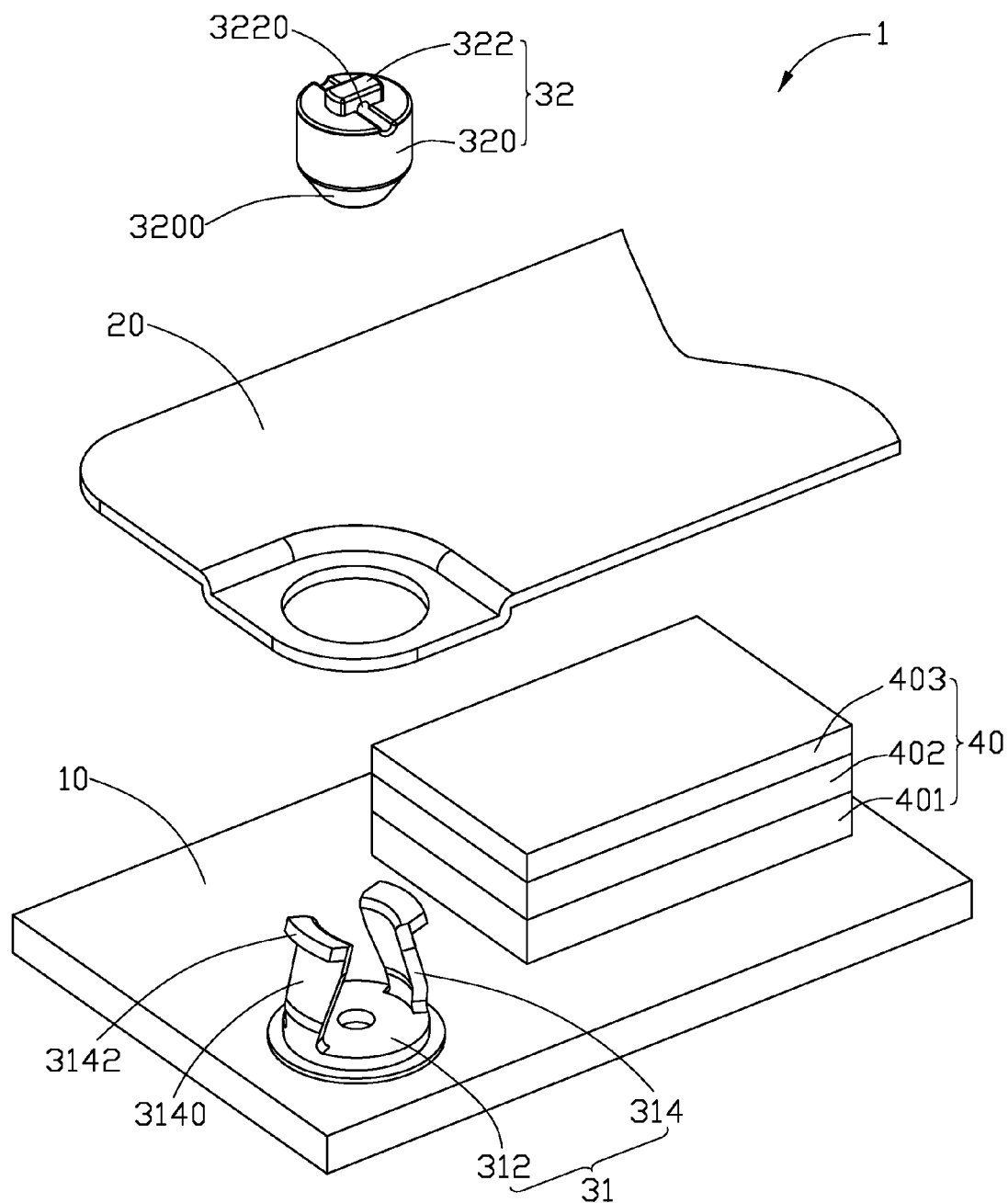
FIG. 2 is an isometric view of the electronic apparatus of FIG. 1 before assembling a first member and a second member.

In one embodiment, the electronic apparatus 1 is a motherboard of an electronic product, and the electronic product can be, for example, a mobile phone, a notebook or other portable devices. As shown in FIG. 2, the first member 10 can be a PCB with an electronic-connector 40 formed thereon, and the second member 20 can be a cover for protecting the electronic-connector 40 of the PCB. Therein, the electronic-connector 40 includes a lower connector 401, an upper connector 402 and a buffer 403 arranged from bottom to top in sequence as shown in FIG. 2. In the embodiment, the lower connector 401 is welded on the PCB 10 and can be a female port of an electronic connector of a mobile phone such as a socket. The upper connector 402 can be a male port corresponding to the lower connector 401 such as a plug and is configured to be partly inserted into the lower connector 401. The buffer 403 may be a foam and is adhered to the upper connector 402 at one side to eliminate or minimize the shakings of the electronic-connector 40, thereby avoiding damage to the electronic-connector 40. The second member 20 is fastened on the other side of the buffer 403 to cover and hold the electronic-connector 40. In one alternative embodiment, other different electronic components, for example resistors, capacitors and so on, can also be disposed on the PCB 10 and be protected by the second member 20.

Figure 3:
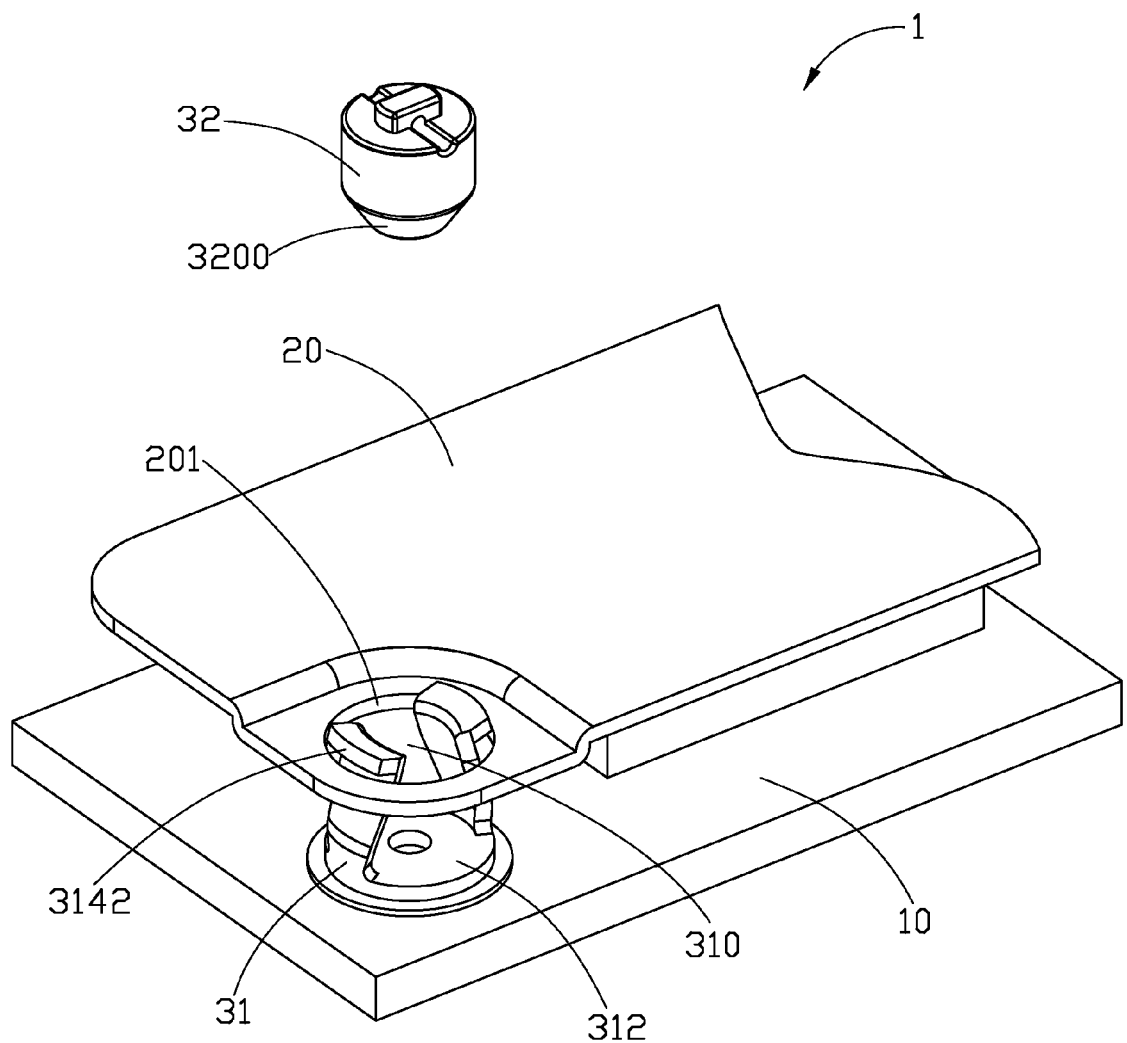
FIG. 3 is an isometric view of the electronic apparatus of FIG. 1 before thrusting a securing plug into a resilient receiver of a connecting assembly.
Figure 4:
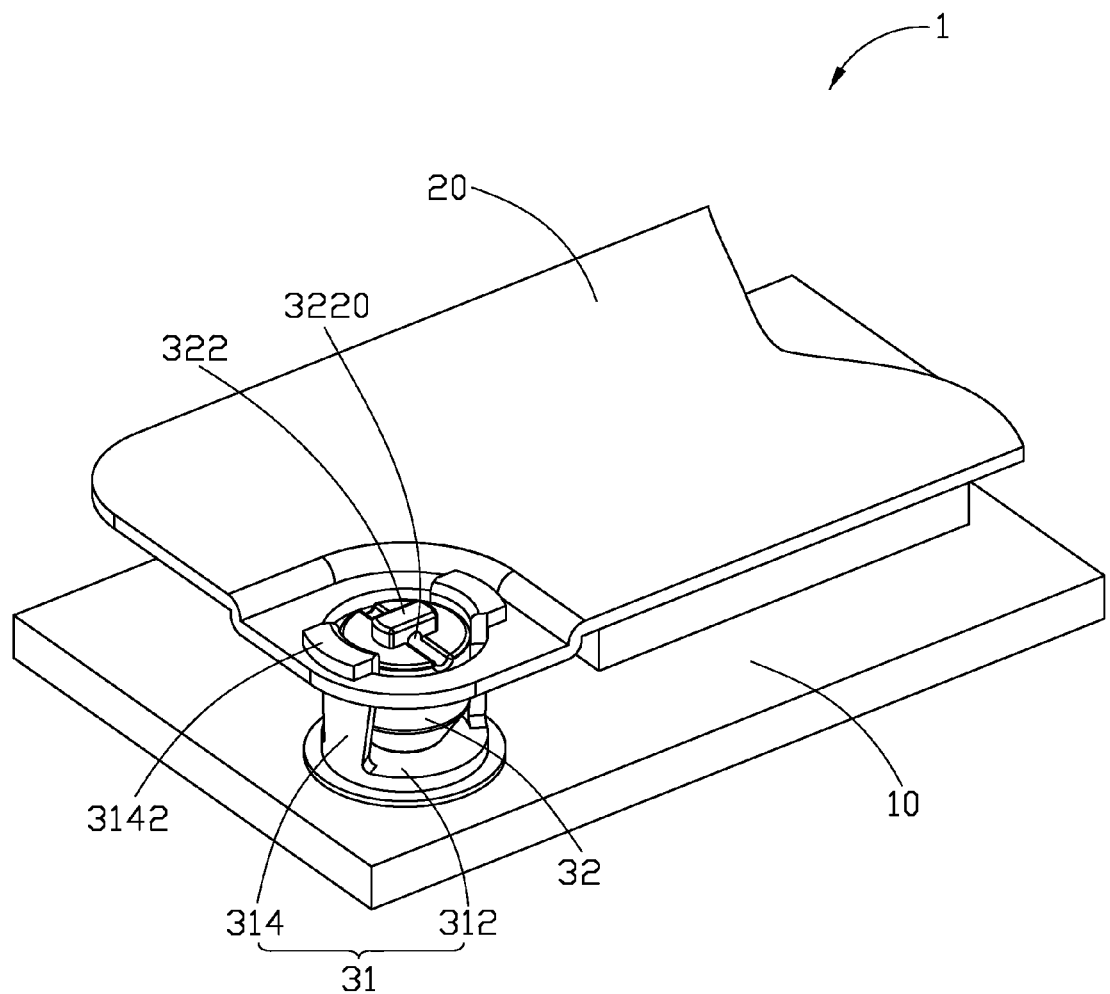
FIG. 4 is an isometric view of the electronic apparatus of FIG. 1 finishing assembling the first member and the second member.

As shown in FIG. 1, the second member 20 defines a through hole 201 at a corner. The connecting assembly 30 is formed or mounted at a corner of the first member 10 and includes a resilient receiver 31 and a securing plug 32. The resilient receiver 31 defines a receiving space 310. As shown in FIGS. 3 and 4, top of the resilient receiver 31 passes through the through hole 201 of the second member 20 with part of the resilient receiver 31 received in the through hole 201. When being applied an external force, the securing plug 32 is thrust into the receiving space 310, which expands the top of the resilient receiver 31 and drives the resilient receiver 31 to resist and secure in the through hole 201. Therefore, the first member 10 and the second member 20 can be effectively assembled by the connecting assembly 30 as shown in FIG. 4.

FIG. 2 shows the electronic apparatus 1 of FIG. 1 before assembling the first member 10 and the second member 20. In the embodiment, the resilient receiver 31 is U-shaped and includes a cylindrical base 312 and two elastic arms 314 extending upward from two opposite sides of the base 312. The resilient receiver 31 is welded or adhered on the first member 10, and is disposed on a position relative to the through hole 201 of the second member 20.

The two elastic arms 314 symmetrically surround the central location of the base 312 to achieve a uniform force. The receiving space 310 is defined by the two elastic arms 314. Each elastic arm 314 includes an elastic part 3140 and a hook 3142. The elastic part 3140 extends upward from one side of the base 312, and the hook 3142 extends outward from one sidewall of the elastic part 3140 away from the base 312 and is substantially perpendicular to the elastic part 3140. An opening of the receiving space 310 is defined by the two hooks 3142 of the two elastic arms 314. In one alternative embodiment, a plurality of elastic arms 314, for example three or more elastic arms 314, are arranged sequentially along the sides of the base 312 with equal distances.

The securing plug 32 includes a main body 320 and a handgrip member 322 to be conveniently held by a user. One end of the main body 320 includes a conical part 3200, and a diameter of one end of the conical part 3200 away from the main body 320 is less than that of the other end of the conical part 3200 for easily thrusting the securing plug 32 into the resilient receiver 31 by the user. The handgrip member 322 protrudes from the other end of the main body 320. A through opening 3220 is defined in a surface of the other end of the main body 320 to pass through the handgrip member 322 as shown in FIG. 4, so as to insert a corresponding tool (not shown) for conveniently pulling out the securing plug 32 from the through opening 3220 when disassembling the first member 10 and the second member 20.

FIG. 3 shows the electronic apparatus 1 of FIG. 1 before thrusting the securing plug 32 into the resilient receiver 31. FIG. 4 shows the electronic apparatus 1 of FIG. 1 finishing assembling the first member 10 and the second member 20. Firstly, the resilient receiver 31 is in a natural state as shown in FIG. 2. An outer diameter defined by the two hooks 3142 is equal to or less than a diameter of the through hole 201, and an inner diameter defined by the two hooks 3142 is less than a diameter of the main body 320. When assembling the first member 10 and the second member 20 is needed, the two hooks 3142 of the resilient receiver 31 pass through the through hole 201 of the second member 20 effectively and completely from bottom to up as shown in FIG. 3. The securing plug 32 is placed on the top of the receiving space 310 and an external force is applied to drive the securing plug 32 through the through hole 201, moving downward and into the receiving space 310, and finally with the peak of the conical part 3200 against a surface of the base 312. The securing plug 32 drives the sidewalls of the two elastic arms 314 to expand outward enlarging the inner diameter and the outer diameter defined by the two hooks 3142 to fix and secure the two hooks 3142 in the through hole 201 of the second member 20. After assembly (see FIG. 4), the inner diameter and outer diameter defined by the two hooks 3142 become larger. So, the outer diameter defined by the two hooks 3142 is slightly larger than the diameter of the through hole 201, and the hooks 3142 are capable of retaining the second member 20.

When disassembling the first member 10 and the second member 20, the user holds the handgrip member 322 of the securing plug 32 and applies an external force to move it upward. With the external force, the securing plug 32 is gradually moved away from the resilient receiver 31. While the securing plug 32 is completely detached from the receiving space 310, the resilient receiver 31 reverts back to its natural state where the outer diameter defined by the two hooks 3142 is now less than the diameter of the through hole 210. Then the first member 10 and the second member 20 can be separated from each other. Of course, the user also can insert the corresponding tool into the through opening 3220 to pull out the securing plug 32.

Figure 5:
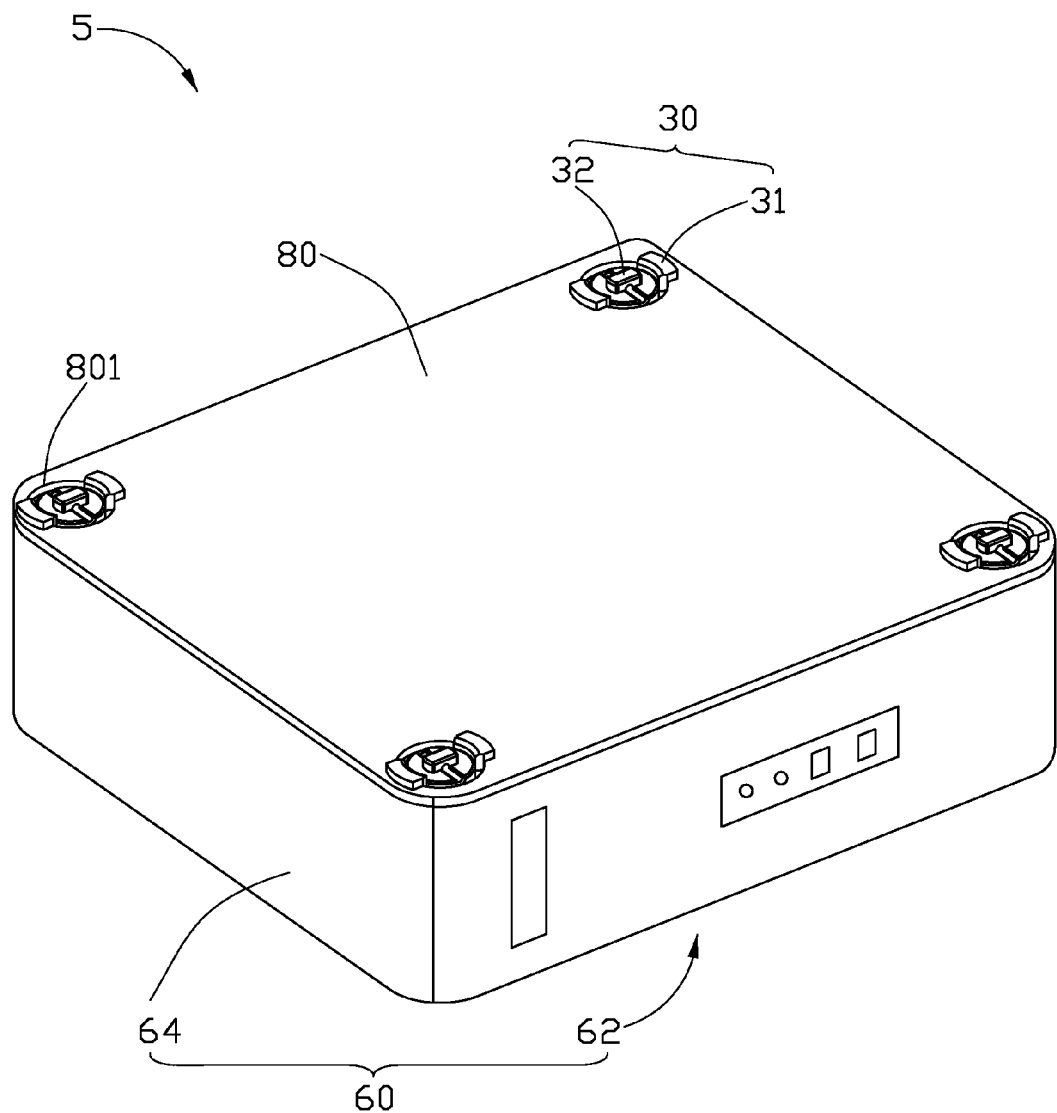
FIG. 5 is an isometric view of an electronic apparatus, according to a second embodiment.

In other embodiments, the electronic apparatus may be a desktop computer. As shown in FIG. 5, the desktop computer 5 includes a housing and a cover corresponding to and covering the housing. The housing is defined as the first member 60, and the cover is defined as the second member 80. The housing 60 includes a bottom plate 62 and four side plates 64 extending from the bottom plate 62. The bottom plate 62 and the four side plates 64 cooperatively define a receiving space (not shown) to receive a plurality of different electronic components, for example, a fan, a motherboard, graphics cards and so on.

As shown in FIG. 5, the cover 80 disposed to cover the receiving space is rectangular, and defines four through holes 801 at its four corners. The desktop computer 5 further includes four connecting assemblies 30 corresponding to the four through holes 801 to connect and fix the housing 60 and the cover 80. Each connecting assembly 30 has the same structure as above (see FIG. 2) and also includes the resilient receivers 31 and the securing plug 32. The housing 60 further defines four protrusions (not shown) in the receiving space, and the four protrusions protrude from the bottom plate 62 and correspond to the four through holes 801. Four resilient receivers 31 of the four connecting assemblies 30 are respectively welded on the four protrusions of the housing 60 relative to the four through holes 801. When covering the cover 80 on the housing 60 is needed, tops of the fours resilient receivers 31 respectively pass through the four corresponding through holes 801 of the cover 80 from bottom to up. Via coordinating the resilient receiver 31 with the securing plug 32 similar to the connecting assembly 30 as shown in FIG. 4, the cover 80 can be effectively fixed on the housing 60 to cover the receiving space of the housing 60 by the four connecting assemblies 30.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A connecting assembly for connecting a first member and a second member, the second member defining a through hole, and the connecting assembly comprising:

a resilient receiver fixed to the first member and defining a receiving space, wherein a top of the resilient receiver passes through the through hole; and a securing plug configured to be inserted into the receiving space, which expands a part of the resilient receiver so as to fix the top of the resilient receiver on the second member thereby connecting the first member with the second member.

2. The connecting assembly as recited in claim 1, wherein the resilient receiver is welded on the first member corresponding to the through hole of the second member.

3. The connecting assembly as recited in claim 2, wherein the resilient receiver comprises a base and at least two elastic arms extending upward from sides of the base, and the receiving space is defined by the at least two elastic arms.

4. The connecting assembly as recited in claim 3, wherein each one of the at least two elastic arms comprises an elastic part and a hook extending from the elastic part, the elastic part extends upward from the base, and the hook is perpendicular to and extends outward from the elastic part.

5. The connecting assembly as recited in claim 4, the resilient receiver is U-shaped.

6. The connecting assembly as recited in claim 1, wherein the securing plug comprises a main body and a handgrip member, the handgrip member protrudes from one end of the main body.

7. The connecting assembly as recited in claim 6, wherein a through opening is defined in a surface of the one end of the main body to pass through the handgrip member.

8. The connecting assembly as recited in claim 7, wherein the other end of the main body comprises a conical part.

9. An electronic apparatus comprising:
a first member;
a second member defining a through hole; and
a connecting assembly for connecting the first member and the second member, and the connecting assembly comprising:
a resilient receiver fixed to the first member and defining a receiving space, wherein a top of the resilient receiver passes through the through hole; and
a securing plug configured to be inserted into the receiving space, which expands a part of the resilient receiver so as to fix the top of the resilient receiver on the second member thereby connecting the first member with the second member.

10. The electronic apparatus as recited in claim 9, wherein the resilient receiver comprises a base and at least two elastic arms extending upward from sides of the base, and the receiving space is defined by the at least two elastic arms.

11. The electronic apparatus as recited in claim 10, wherein each one of the at least two elastic arms comprises an elastic part and a hook extending from the elastic part, the elastic part extends upward from the base, and the hook is perpendicular to and extends outward from the elastic part.

12. The electronic apparatus as recited in claim 9, wherein the securing plug comprises a main body and a handgrip member, the handgrip member protrudes from one end of the main body.

13. The electronic apparatus as recited in claim 12, wherein a through opening is defined in a surface of the one end of the main body to pass through the handgrip member.

14. The electronic apparatus as recited in claim 13, wherein the other end of the main body comprises a conical part.

* * * * *